US012135509B2

(12) United States Patent
Shirahata

(10) Patent No.: US 12,135,509 B2
(45) Date of Patent: Nov. 5, 2024

(54) IMAGE FORMING APPARATUS

(71) Applicant: CANON KABUSHIKI KAISHA, Tokyo (JP)

(72) Inventor: Norihiro Shirahata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/230,828

(22) Filed: Aug. 7, 2023

(65) Prior Publication Data

US 2024/0103396 A1 Mar. 28, 2024

(30) Foreign Application Priority Data

Sep. 24, 2022 (JP) ................................ 2022-152043

(51) Int. Cl.
*G03G 15/06* (2006.01)
*G03G 15/02* (2006.01)
*G03G 15/08* (2006.01)
*G03G 15/16* (2006.01)

(52) U.S. Cl.
CPC ....... *G03G 15/065* (2013.01); *G03G 15/0266* (2013.01); *G03G 15/0808* (2013.01); *G03G 15/1675* (2013.01); *G03G 2215/021* (2013.01)

(58) Field of Classification Search
CPC ............. G03G 15/1675; G03G 15/161; G03G 15/0266
See application file for complete search history.

(56) References Cited

U.S. PATENT DOCUMENTS

| | | | | |
|---|---|---|---|---|
| 10,444,656 | B2 | 10/2019 | Kanazawa | |
| 2002/0057933 | A1* | 5/2002 | Ebihara | G03G 15/0131 399/303 |
| 2015/0185668 | A1* | 7/2015 | Matsuzaki | G03G 15/1645 399/315 |
| 2020/0218195 | A1* | 7/2020 | Hirata | G03G 21/0094 |
| 2020/0310346 | A1* | 10/2020 | Asami | G03G 21/203 |

FOREIGN PATENT DOCUMENTS

| | | | |
|---|---|---|---|
| JP | H09-073217 | A | 3/1997 |
| JP | 2013-195569 | A | 9/2013 |
| JP | 2014-081514 | A | 5/2014 |
| JP | 2018-200351 | A | 12/2018 |

* cited by examiner

*Primary Examiner* — Jessica L Eley
(74) *Attorney, Agent, or Firm* — VENABLE LLP

(57) ABSTRACT

An image forming apparatus includes a controller. The controller controls to perform a first operation in which a first potential difference is formed between a supplying member and a developing member, the first potential difference being a potential difference in a direction in which an electrostatic force in a first direction toward the developing member from the supplying member is acted on toner charged to a normal polarity, and a second operation in which a second potential difference is formed between them and in a second direction opposite to the first direction. When an image forming operation is performed, the controller controls timing for changing from the first operation to the second operation based on information on presence or absence of a recording material in a conveyance passage toward a transferring portion in a non-image forming operation before the recording material is nipped and conveyed at the transferring portion.

17 Claims, 7 Drawing Sheets

IMAGE FORMING APPARATUS

FIELD OF THE INVENTION AND RELATED ART

The present invention relates to an image forming apparatus such as a printer, a copy machine, and a facsimile machine using an electrophotographic or an electrostatic recording method.

Conventionally, in the image forming apparatus using the electrophotographic method such as a printer, an electrostatic latent image is formed on an image bearing member such as a photosensitive drum, and the electrostatic latent image is developed with toner to form a toner image on the image bearing member. After the toner image on the image bearing member is transferred to a recording material, the toner image is fixed on the recording material by being heated and pressurized. One method of developing the electrostatic latent image is to supply the toner accommodated in a developer accommodating portion onto a developing roller as a developing member by a supplying roller as a supplying member, and to adhere the toner to the electrostatic latent image on the image bearing member by the developing roller.

Incidentally, although the recording material is sometimes referred to as a “paper (or sheet)”, the recording material may be made of a material other than a paper or include a material other than a paper, such as a synthetic paper or a film formed mainly of a synthetic resin, or a metallized paper (special paper) composed of a metal layer. In addition, with regard to the recording material, a “leading end” and a “trailing end” shall mean the leading end and the trailing end with respect to a conveyance direction of the recording material, respectively.

In the image forming apparatus as described above, the toner may remain on the developing roller, and a state of the toner may change by the toner being rubbed in a nip portion (supplying nip portion) formed by the developing roller and the supplying roller. As a result, a decrease in density of an image to be formed becomes likely to occur.

Thus, during an operation of the image forming apparatus, a method (here, also referred to as “scraping”) in which bias applied to the developing roller and the supplying roller is controlled in a predetermined section on the developing roller to move the toner remaining on the developing roller toward the supplying roller can be considered. In Japanese Patent Application Laid-Open No. 2014-81514, a method of setting the bias so that the toner on the developing roller is moved to the supplying roller side in a non-developing section on the developing roller, in which no development is performed and which corresponds to a sheet interval which is an interval between a preceding sheet and a following sheet, is disclosed.

However, a sheet interval fluctuates due to variation in feeding of the sheet upon feeding the sheet from a cassette, etc. Therefore, in a case in which the scraping is performed at always the same non-developing section regardless of a feeding timing of the sheet, if the sheet interval narrows, a developing section in which the developing is performed on the developing roller and a scraping section in which the scraping is performed on the developing roller may overlap. As a result, a predetermined amount of the toner cannot be supplied onto the developing roller in the developing section, which may result in an occurrence of an image defect.

SUMMARY OF THE INVENTION

An object of the present invention, therefore, is to properly perform the scraping of the toner from the developing member to the supplying member side even in cases in which the sheet interval fluctuates.

The above object is achieved with an image forming apparatus according to the present invention. In summary, the present invention is an image forming apparatus comprising: a rotatable image bearing member configured to bear a toner image; a rotatable developing member configured to supply toner charged to a normal polarity to the image bearing member at a developing portion and to form the toner image on the image bearing member; a supplying member configured to form a supplying portion by contacting the developing member and to supply the toner onto the developing member in the supplying portion; a transferring member configured to form a transferring portion by contacting the image bearing member, the transferring member transferring the toner image from the image bearing member to a recording material nipped and conveyed by the image bearing member and the transferring member in the transferring portion: a feeding member configured to feed the recording material toward the transferring portion; a detecting portion configured to detect information on presence or absence of the recording material in a conveyance passage of the recording material fed toward the transferring portion by the feeding member; a developing voltage applying portion configured to apply a developing voltage to the developing member; a supplying voltage applying portion configured to apply a supplying voltage to the supplying member; and a control portion configured to control the developing voltage applying portion and the supplying voltage applying portion, wherein the control portion controls to perform a first operation in which a first potential difference is formed between the supplying member and the developing member, the first potential difference being a potential difference in a direction in which an electrostatic force in a direction toward the developing member from the supplying member is acted on the toner charged to the normal polarity, and a second operation in which a second potential difference is formed between the supplying member and the developing member, the second potential difference being a potential difference in a direction in which an electrostatic force in a direction toward the supplying member from the developing member is acted on the toner charged to the normal polarity, and wherein when an image forming operation in which the toner image is transferred onto the recording material is performed, the control portion controls timing for changing from the first operation to the second operation based on the information detected by the detecting portion in a non-image forming operation before the recording material is nipped and conveyed at the transferring portion.

According to another aspect of the present invention, there is provided an image forming apparatus comprising: a rotatable image bearing member configured to bear a toner image: a rotatable developing member configured to supply toner charged to a normal polarity to the image bearing member at a developing portion and to form the toner image on the image bearing member; a supplying member configured to form a supplying portion by contacting the developing member and to supply the toner onto the developing member in the supplying portion: a transferring member configured to form a transferring portion by contacting the image bearing member, the transferring member transferring the toner image from the image bearing member to a recording material nipped and conveyed by the image bearing member and the transferring member in the transferring portion: a feeding member configured to feed the recording material toward the transferring portion, a detecting portion configured to detect information on presence or absence of the recording material in a conveyance passage of the recording material fed toward the transferring portion by the feeding member; a developing voltage applying portion configured to apply a developing voltage to the developing member: a supplying voltage applying portion configured to apply a supplying voltage to the supplying member: and a control portion configured to control the developing voltage applying portion and the supplying voltage applying portion, wherein the control portion controls to perform a first operation in which a first potential difference is formed between the supplying member and the developing member, the first potential difference being a potential difference in a direction in which an electrostatic force in a direction toward the developing member from the supplying member is acted on the toner charged to the normal polarity, and a second operation in which a second potential difference is formed between the supplying member and the developing member, the second potential difference being a potential difference in a direction in which an electrostatic force in a direction toward the supplying member from the developing member is acted on the toner charged to the normal polarity, and wherein when an image forming operation in which the toner image is transferred onto the recording material is performed, the control portion controls timing for changing from the second operation to the first operation based on the information detected by the detecting portion in a non-image forming operation before the recording material is nipped and conveyed at the transferring portion.

According to another aspect of the present invention, there is provided an image forming apparatus comprising: a rotatable image bearing member configured to bear a toner image; a rotatable developing member configured to supply toner charged to a normal polarity to the image bearing member at a developing portion and to form the toner image on the image bearing member: a supplying member configured to form a supplying portion by contacting the developing member and to supply the toner onto the developing member in the supplying portion; a transferring member configured to form a transferring portion by contacting the image bearing member, the transferring member transferring the toner image from the image bearing member to a recording material nipped and conveyed by the image bearing member and the transferring member in the transferring portion; a feeding member configured to feed the recording material toward the transferring portion; a detecting portion configured to detect information on presence or absence of the recording material in a conveyance passage of the recording material fed toward the transferring portion by the feeding member; a developing voltage applying portion configured to apply a developing voltage to the developing member; a supplying voltage applying portion configured to apply a supplying voltage to the supplying member; and a control portion configured to control the developing voltage applying portion and the supplying voltage applying portion, wherein the control portion controls to perform a first operation in which a first potential difference is formed between the supplying member and the developing member, the first potential difference being a potential difference in a direction in which an electrostatic force in a direction toward the developing member from the supplying member is acted on the toner charged to the normal polarity, and a second operation in which a second potential difference is formed between the supplying member and the developing member, the second potential difference being a potential difference in a direction in which an electrostatic force in a direction toward the supplying member from the developing member is acted on the toner charged to the normal polarity, wherein an area of the developing member which forms the supplying portion in a state of performing the first operation is defined as a first area, an area of the image bearing member which forms the developing portion with the first area by rotating of the developing member and reaching of the first area to the developing portion is defined as a second area, an area of the developing member which forms the supplying portion in a state of performing the second operation is defined as a third area, and an area of the image bearing member which forms the developing portion with the third area by rotating of the developing member and reaching of the third area to the developing portion is defined as a fourth area, and wherein the control portion controls so that the second area forms the transferring portion in a case in which the recording material is nipped and conveyed in the transferring portion by controlling timing for changing from the second operation to the first operation based on the information detected by the detecting portion, or the control portion controls so that the fourth area forms the transferring portion in a case in which the recording material is not nipped and conveyed in the transferring portion by controlling timing for changing from the first operation to the second operation based on the information detected by the detecting portion.

Further features of the present invention will become apparent from the following description of exemplary embodiments with reference to the attached drawings.

DESCRIPTION OF THE EMBODIMENTS

Figure 1:
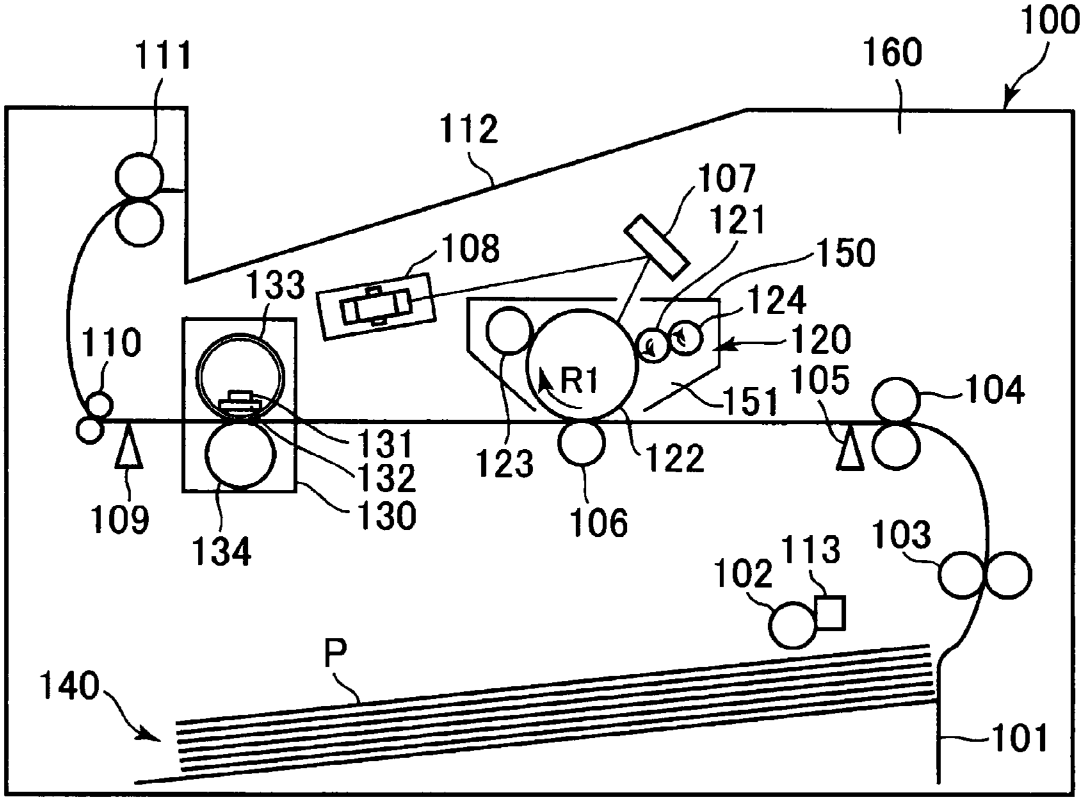
FIG. 1 is a schematic cross-sectional view of an image forming apparatus.

Hereinafter, an image forming apparatus according to the present invention will be described in more detail with referring to the drawings.

Description of the Image Forming Apparatus

First, an overall configuration of the image forming apparatus 100 of an Embodiment 1 will be described. FIG. 1 is a schematic cross-sectional view of the image forming apparatus 100 of the present Embodiment. The image forming apparatus 100 of the present Embodiment is a laser printer of an electrophotographic method. The image forming apparatus 100 forms an image (a black monochrome image) on a sheet P according to an image information input from an external device such as a host computer.

(Image Forming Portion)

The image forming apparatus 100 is provided with a photosensitive drum 122 which is a rotatable and drum-shaped (cylindrical) electrophotographic photosensitive member (photosensitive member) as an image bearing member. The photosensitive drum 122 is driven and rotated in a direction of an arrow R1 (clockwise direction) in FIG. 1. Around the photosensitive drum 122, following means are disposed. First, a charging roller 123, which is a roller-shaped charging member, as a charging means is disposed. In addition, a scanner unit (exposure device) 108 as an exposure means is disposed. In addition, a developing device 150 as a developing means is disposed. In addition, a transferring roller 106, which is a roller-shaped transferring member, as a transferring means is disposed. In order along the rotational direction R1 of the photosensitive drum 122, a charging portion (charging position) by the charging roller 123, an exposure portion (exposure position) by the scanner unit 108, a developing portion (developing position) by the developing device 150, and a transferring portion (transferring position) by the transferring roller 106 are disposed. Incidentally, a cleaning device as a cleaning means may be further disposed around the photosensitive drum 122. In addition, the image forming apparatus 100 may have a cleaner-less configuration in which no cleaning device is disposed.

In the present Embodiment, the image forming portion refers to a group of members directly pertaining to a formation of a toner image such as the scanner unit 108, the photosensitive drum 122, the charging roller 123, the developing roller 121, and the supplying roller 124. In the present Embodiment, the charging roller 123 and the developing device 150 (the developing roller 121, the supplying roller 124, etc.) form a process means acting on the photosensitive drum 122, and the photosensitive drum 122 constitute a process cartridge 120. The process cartridge 120 is attachable to and detachable from a main body 160 of the image forming apparatus 100.

When a print operation starts, a rotating surface of the photosensitive drum 122 is uniformly charged by the charging roller 123 to a predetermined potential of a predetermined polarity (negative polarity in the present Embodiment). During the charging process, a predetermined charging voltage (charging bias), which is a direct current voltage of the same polarity (negative polarity in the present Embodiment) as a normal charging polarity (normal polarity) of the toner, is applied to the charging roller 123 by a charging power source (not shown) as a charging voltage application means (charging voltage application portion). The charging roller 123 is disposed in contact with the photosensitive drum 122. The charging roller 123 is driven and rotated by a rotation of the photosensitive drum 122. In the present Embodiment, a charging voltage of −1000 V, for example, is applied to the charging roller 123, and the surface of the photosensitive drum 122 is uniformly charged to a dark potential (charging potential) of −550V, for example. The surface of the photosensitive drum 122 that is charged is scanned and exposed by the scanner unit 108 according to the image information and an electrostatic latent image (electrostatic image) is formed on the photosensitive drum 122. The scanner unit 108 is provided with a laser diode (light emitting element) and irradiates the surface of the photosensitive drum 122, which is driven and rotated, with a laser beam by reflecting the laser beam emitted from the laser diode with a reflective mirror 107. When the electrostatic latent image is formed on the surface of the photosensitive drum 122 that is charged and irradiated by the laser beam, a surface potential of areas to which the laser beam is irradiated on the photosensitive drum 122 becomes a light portion potential of −100 V, for example.

Figure 4:
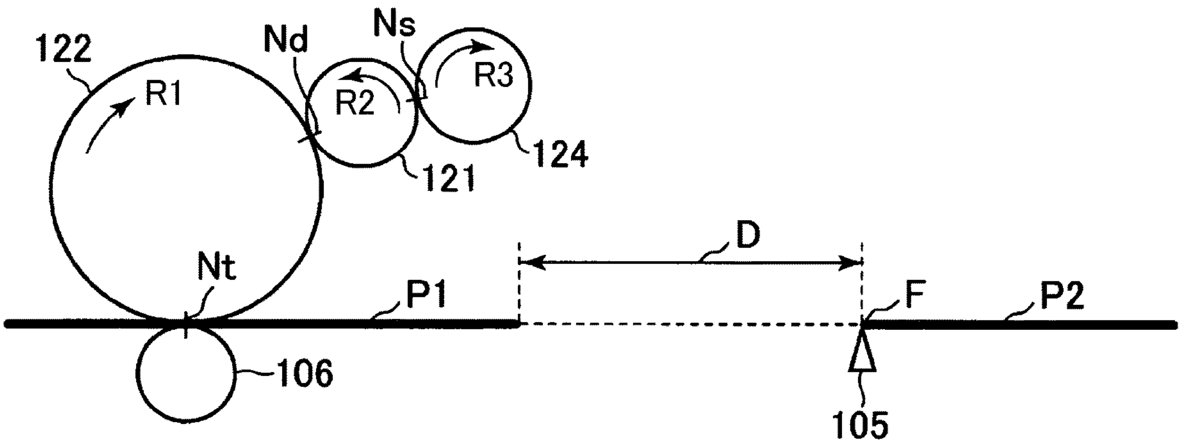
FIG. 4 is a schematic view for explaining a method to determine the scraping setting.

The electrostatic latent image formed on the photosensitive drum 122 is developed (visualized) with the toner supplied by the developing device 150 as the developing means, and the toner image is formed on the photosensitive drum 122. The developing device 150 is provided with a developer accommodating portion 151 that accommodates the toner as a developer, and the developing roller 121 as a developing member (developer bearing member) that bears and conveys the toner to an opposing portion to the photosensitive drum 122. In addition, the developing device 150 is provided with a supplying roller 124 as a supplying member that supplies the toner accommodated in the developer accommodating portion 151 to the developing roller 121, and a developer blade (not shown) as a regulating member that regulates an amount of the toner on the developing roller 121. The developing roller 121 is constituted by a core metal surrounded by a rubber layer. The supplying roller 124 is constituted by a core metal surrounded by a sponge layer. In the present Embodiment, the developing device 150 uses a non-magnetic one-component developer (toner) as the developer. The developing roller 121 is disposed in contact with the photosensitive drum 122. The developing roller 121 is driven and rotated in a direction of an arrow R2 (counterclockwise direction) as shown in FIG. 4. In other words, the developing roller 121 is driven and rotated along a direction in which the photosensitive drum 122 and the developing roller 121 move in a forward direction at a contact portion (developing nip portion, developing portion) Nd between the photosensitive drum 122 and the developing roller 121. The supplying roller 124 is disposed in contact with the developing roller 121. The supplying roller 124 is driven and rotated in a direction of an arrow R3 (clockwise direction) in FIG. 4. In other words, the supplying roller 124 is driven and rotated along a direction in which the developing roller 121 and the supplying roller 124 move in a reverse direction at a contact portion (supplying nip portion, supplying portion) Ns between the developing roller 121 and the supplying roller 124.

Upon developing the electrostatic latent image on the photosensitive drum 122, a predetermined developing voltage (developing bias), which is a direct current voltage having the same polarity as the normal charging polarity of the toner (negative polarity in the present Embodiment), is applied to the developing roller 121 by a developing power source E1 (FIG. 2) as a developing voltage applying means (developing voltage applying portion). In addition, upon supplying the toner to the developing roller 121, a predetermined supplying voltage (supplying bias) is applied to the supplying roller 124 by a supplying power source E2 (FIG. 2) as a supplying voltage applying means (supplying voltage applying portion). The supplying voltage is a direct current voltage having the same polarity as the normal charging polarity of the toner (negative polarity in the present Embodiment) and is higher on the normal charging polarity side of the toner than the above developing voltage. An electric charge of the negative polarity is imparted to the toner on the developing roller 121 by a sliding between the developing roller 121 and the supplying roller 124, and furthermore between the developing roller 121 and the developer blade. The electrically imparted toner adheres to an image portion of the electrostatic latent image on the photosensitive drum 122 at the contact portion between the photosensitive drum 122 and the developing roller 121 to form the toner image. Thus, in the present Embodiment, the toner charged with the same polarity as the charging polarity of the photosensitive drum 122 (negative polarity in the present Embodiment) adheres to an exposing portion (image portion) on the photosensitive drum 122, where an absolute value of the potential has decreased by being exposed after being uniformly charged (reverse development method). In the present Embodiment, the normal charging polarity of the toner, which is a main charging polarity of the toner upon the development, is the negative polarity. In the present Embodiment, a developing voltage of −400 V, for example, is applied to the developing roller 121, and the toner is supplied from the developing roller 121 to the electrostatic latent image on the photosensitive drum 122 to form the toner image on the photosensitive drum 122. In addition, in the present Embodiment, a supplying voltage of −500 V, for example, is applied to the supplying roller 124 and the toner is supplied from the supplying roller 124 to the developing roller 121 side.

The toner image formed on the photosensitive drum 122 is transferred onto the sheet (recording material, transfer material, recording medium, paper) P by the transferring roller 106. The transferring roller 106 is disposed in contact with the photosensitive drum 122. The transferring roller 106 is driven and rotated by the rotation of the photosensitive drum 122. Upon the transfer, a predetermined transferring voltage (transferring bias), which is a direct current voltage having a reverse polarity to the normal charging polarity of the toner, is applied to the transferring roller 106 by a transferring power source (not shown) as a transferring voltage applying means (transferring voltage applying portion). In the present Embodiment, the toner image on the photosensitive drum 122 is transferred onto the sheet P, which is nipped and conveyed between the photosensitive drum 122 and the transferring roller 106 by a transferring voltage of +1500 V, for example, being applied to the transferring roller 106 and an electric charge being supplied from a back of the sheet P. The sheet P is introduced in a manner as described below into a contact portion (transferring nip portion, transferring portion) Nt (see FIG. 4) between the photosensitive drum 122 and the transferring roller 106.

(Fixing Portion)

The fixing unit 130 as a fixing means constituting a fixing portion is provided with a heater 132, a fixing film 133, a pressing roller 134, etc., and forms a contact portion (fixing nip portion) having a predetermined width with a predetermined pressure contact force between the fixing film 133 and the pressing roller 134. The fixing unit 130 applies heat and pressure to the toner image formed on the sheet P and fixes the toner onto the sheet P. In other words, the sheet P that bears unfixed toner image is introduced to the fixing nip portion under a condition in which heat is applied by the heater 132 and temperature is conditioned to a predetermined temperature with the temperature being detected by a thermistor 131. And the unfixed toner image on the sheet P is fixed (melted, fixedly adhered) onto the sheet P by being heated and pressurized in a process in which the sheet P is nipped and conveyed by the fixing film 133 and the pressing roller 134.

(Sheet Conveyance Portion)

In the present Embodiment, the sheet conveyance portion refers to a group of members pertaining to a feeding and a conveyance of the sheet P, which includes each of conveyance roller, which includes a sheet feeding member for feeding the sheet P from a cassette 101 as described below, and sensors disposed along a conveyance passage.

A sheet bundle 140 is accommodated in the cassette 101 as a recording material accommodating portion. During the print operation, the topmost sheet P of the paper bundle 140 accommodated in the cassette 101 is fed by a feeding roller 102 as a feeding member by a sheet feeding solenoid 113 as a drive switching member being driven. The sheet P is conveyed by a conveyance roller 103 and a registration roller 104 as conveyance members. A leading end portion and a trailing end portion of the sheet P conveyed by the conveyance roller 103 and the registration roller 104 is detected by a registration sensor 105 as a recording material detecting means disposed along the conveyance passage.

At the image forming portion, the toner image on the photosensitive drum 122 is transferred onto the sheet P conveyed by the conveyance roller 130 and the registration roller 104. Thereafter, the toner image is fixed on the sheet P at the fixing portion. And the sheet P passing through the fixing portion is detected by a fixing and discharging sensor 109 as the recording material detecting means, is conveyed by a discharging roller 110 and a FD roller 111 as discharging members, and is discharged (output) to a discharge tray 112 as a discharge portion.

Incidentally, the image forming apparatus 100 performs the print operation (print job) which is a series of operations to form and output images on a single or multiple recording materials P, initiated by a single start instruction. In general, the print operation includes an image forming process (image forming operation), a pre-rotation process, a sheet interval process when images are formed on multiple recording materials P. and a post-rotation process. The image forming process is a period during which a formation of the electrostatic latent image of an image to be actually formed on and output to the recording material P, a formation of the toner image, and a transfer of the toner image are performed, and an image forming time (image forming operation time) refers to this period. More specifically, a timing of the image forming time differs between positions where each of processes of the formation of the electrostatic latent image, the formation of the toner image, and the transfer of the toner image is performed, and corresponds to a period when an image forming area on the photosensitive drum 122 is passing through each of the above positions. The pre-rotation process is a period between when the start instruction is input and when an image actually begins to be formed, in which a preparatory operation prior to the image forming process is performed. The sheet interval process (process between images, process between recording materials, operation between recording materials) corresponds to a period between when one recording material P passes and when the next recording material P comes (sheet interval) in a case in which image formations are continuously performed onto a plurality of recording materials P (continuous image formation, continuous printing). The post-rotation process is a period during which an organizing operation (preparatory operation) is performed after the image forming process. A non-image forming time (non-image forming operation time), which is a period other than the image forming time, includes the pre-rotation process, the sheet interval process, and the post-rotation process described above, and further includes a pre-multi-rotation process, which is a preparatory operation when the image forming apparatus 100 is turned on or recovers from a sleep state, etc. More specifically, a timing of the non-image forming time corresponds to a period when a non-image forming area on the photosensitive drum 122 is passing through each of positions where the formation of the electrostatic latent image, the formation of the toner image, and the transfer of the toner image mentioned above are performed. Here, the image forming area on the photosensitive drum 122 is an area where the toner image that is transferred to the recording material P and output from the image forming apparatus 100 can be formed, and which is set in advance according to a size of the recording material P, etc., and the non-image forming area is an area other than the image forming area. For simplicity's sake, in the present Embodiment, it is described that the image forming area is substantially the same size as the recording material P. Thus, in the present Embodiment, the sheet interval is an interval between the trailing end of a preceding recording material P and the leading end of a following recording material P. However, the sheet interval may be an interval between a trailing end of the image forming area of the preceding recording material P and a leading end of the image forming area of the following recording material P.

<Description of a System Configuration of the Image Forming Apparatus System>

Figure 2:
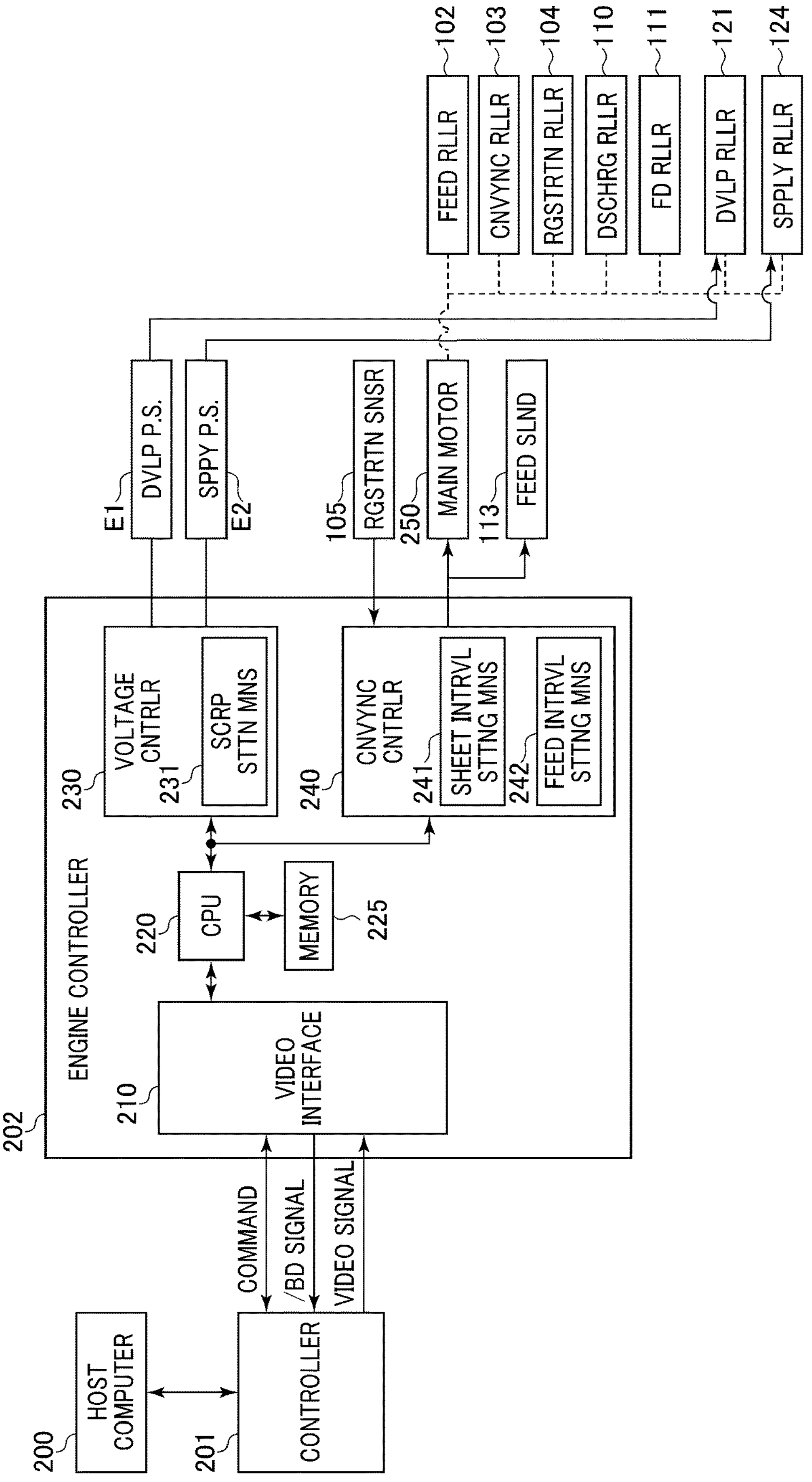
FIG. 2 is a block diagram illustrating a system configuration of the image forming apparatus.

Next, a system configuration of the image forming apparatus 100 of the present Embodiment will be described. FIG. 2 is a schematic block diagram illustrating the system configuration of the image forming apparatus 100 of the present Embodiment. In FIG. 2, a configuration that is necessary for a description of the present Embodiment is mainly shown, and other configurations are omitted as appropriate.

In the image forming apparatus 100, a controller 201 and an engine control portion 202 are provided. The engine control portion 202 as a control means is provided with a CPU 220 as a calculation control means, a memory 225 such as a ROM, a RAM, and a nonvolatile memory as storage means, and an input/output portion that controls an exchange of information (signals) between the engine control portion 202 and an external device. The CPU 220 performs a predetermined calculation processes. In the ROM, predetermined control programs, table data, threshold values, etc. are stored. In the RAM, data used for controls are temporarily stored. In the nonvolatile memory, usage history of each part, etc. are stored. And the engine control portion 202 controls each portion of the image forming apparatus 100 according to the control program stored in the ROM and using the information stored in the RAM and the nonvolatile memory as appropriate.

Furthermore, the controller 201 is capable of communicating mutually with a host computer 200 as an external device and the engine control portion 202. When a print data (information including the start instruction, various setting information, the image information, etc.) is input from the host computer 200 to the controller 201, the controller 201 expands the print data and converts the print data into an image data for forming an image. And, based on the image data, the controller 201 generates a video signal for an exposure to expose the photosensitive drum 122 by the scanner unit 108. When the controller 201 completes the generation of the video signal, the controller 201 instructs a start of an image formation by inputting a command to a video interface portion 210 of the engine control portion 202. When the CPU 220 of the engine control portion 202 receives the instruction of the start of the image formation from the video interface portion 210, the CPU 220 activates various actuators such as a main motor 250 and starts a preparation of the image formation. When the preparation of the image formation is completed, the engine control portion 202 starts an output of a BD signal which is a reference timing of an output of the video signal to the controller 201. The engine control portion 202 then controls each portion of the image forming apparatus 100 such as the scanner unit 108 based on the video signal which is output by the controller 201 and performs the aforementioned image forming operations sequentially.

A voltage control portion 230 of the engine control portion 202 controls the voltage applied from the developing power source E1 to the developing roller 121 by controlling the developing power source E1 connected to the developing roller 121 under a control of the CPU 220. In addition, the voltage control portion 230 controls the voltage applied from the supplying power source E2 to the supplying roller 124 by controlling the supplying power source E2 connected to the supplying roller 124 under the control of the CPU 220. The voltage control portion 230 is equipped with a function of a scraping setting means 231. The scraping setting means 231 is configured, as a scraping means, to set the voltage applied to the developing roller 121 and the supplying roller 124 and to set a section on the developing roller 121 that passes through the supplying nip portion Ns (to perform a scraping) while the voltage is applied. In other words, the scraping setting means 231 sets a "scraping voltage" that is applied to either the developing roller 121 or the supplying roller 124, or sets the "scraping voltage" that is applied to both the developing roller 121 and the supplying roller 124. In addition, the scraping setting means 231 sets a "scraping section" in which the scraping on the developing roller 121 is performed based on a measurement result of the sheet interval by a sheet interval measuring means 241 as described below. In other words, the scraping setting means 231 sets a "scraping period" which is a period during which the scraping section on the developing roller 121 is passing through the supplying nip portion Ns. Incidentally, a method for determining the scraping section (scraping period) will be described below. As described above, in the present Embodiment, the scraping setting means 231 is a means for setting both the "scraping voltage" and the "scraping section (scraping period)", and the "scraping voltage" and the "scraping section (scraping period)" are collectively referred to as "scraping settings".

A conveyance control portion 240 of the engine control portion 202 activates a main motor 250 as a drive source during the print operation under the control of the CPU 220. The conveyance control portion 240 then controls a conveyance of the sheet P by driving each roller (the feeding roller 102, the conveyance roller 103, the registration roller 104, the discharging roller 110 and the FD roller 111) pertaining to the conveyance of the sheet P. Incidentally, in the present Embodiment, the main motor 250 is a common driving source that drives the feeding roller 102, the conveyance roller 103, the registration roller 104, the discharging roller 110, the FD roller 111, the developing roller 121, the supplying roller 124, and the photosensitive drum 1. The conveyance control portion 240 is equipped with a function of the sheet interval measuring means 241. The sheet interval measuring means 241 is configured to measure an interval between the preceding sheet P and the trailing sheet P, i.e., the sheet interval, based on detecting timings of the leading end portion of the sheet P and the trailing end portion of the sheet P by the registration sensor 105 as the sheet P is conveyed. The sheet interval measuring means 241 calculates the sheet interval by, for example, taking a difference between the detected timing of the trailing end portion of the sheet P and the detected timing of the leading end portion of the sheet P. In addition, the conveyance control portion 240 is equipped with a function of a sheet feeding interval setting means 242. The sheet feeding interval setting means 242 determines a sheet feeding timing based on, for example, a length of the sheet P with respect to a conveyance direction (here, also referred to as a "sheet length") and a nominal sheet interval. The conveyance control portion 240 drives the sheet feeding solenoid 113 at a determined sheet feeding timing to feed the sheet P.

Incidentally, in the sheet feeding operation as described above, the sheet interval may vary due to variations in the sheet feeding, etc. The following may be considered as factors for the variations. For example, the feeding roller 102 slips and delays the sheet feeding due to a mixing of types of the sheet P with low surface friction, etc. In addition, for example, a conveyance distance to the registration sensor 105 may vary depending on a stacking state of the sheets P in the cassette 101.

<Description of the Scraping>

Next, the scraping (an operation to move the toner retained on the developing roller 121 to the supplying roller 124 side) will be described.

Figure 3:
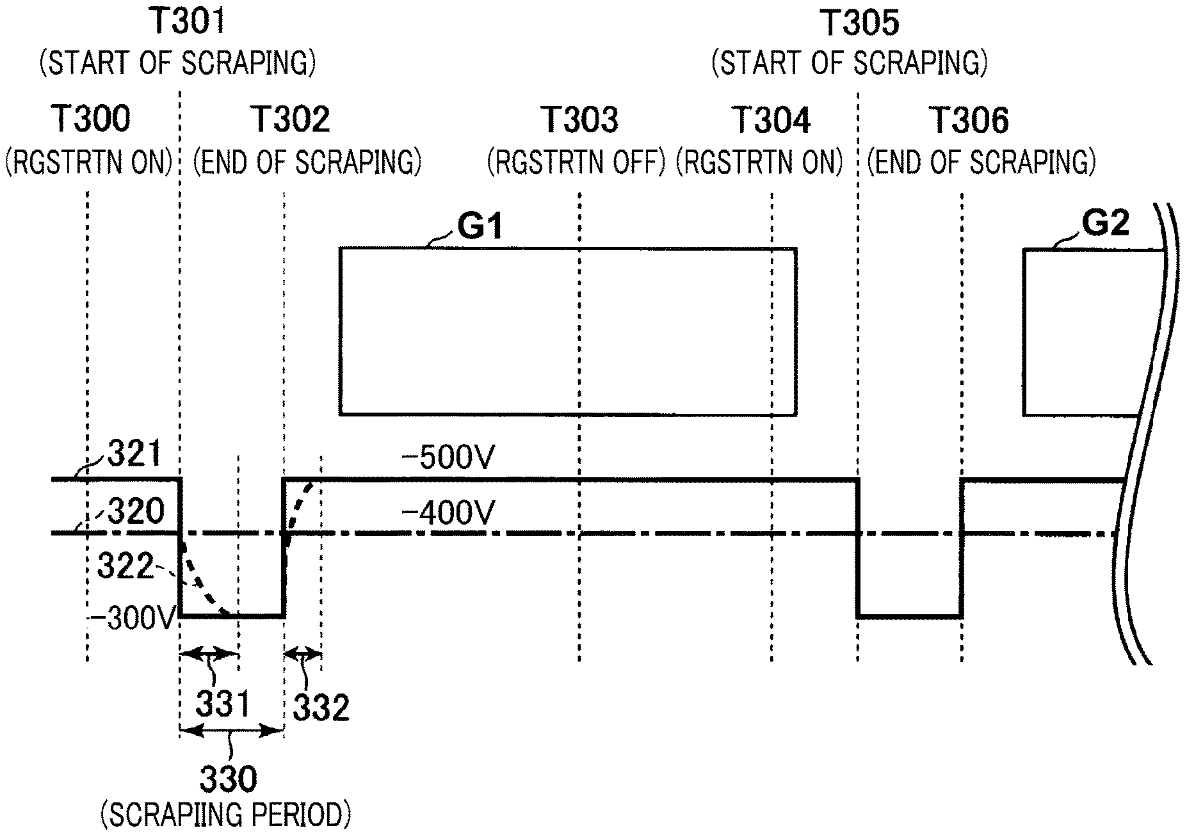
FIG. 3 is an explanatory view of an example of a scraping setting.

FIG. 3 is an explanatory view illustrating an example of the scraping setting during the print operation. In FIG. 3, a chart diagram illustrating transitions of the voltage applying to the developing roller 121 and the voltage applying to the supplying roller 124, and a schematic diagram illustrating a passing timing of the sheet P with respect to the supplying nip portion Ns, which is the contact portion between the developing roller 121 and the supplying roller 124, are shown.

In FIG. 3, T300 and T304 indicate timings ("registration ON") when the leading end portions of the sheet P (here also referred to as a "preceding sheet P1" shown in FIG. 4) onto which the toner image in the image forming area G1 precedingly subjected to image formation is transferred and of the sheet P (here also referred to as a "following sheet P2" shown in FIG. 4) onto which the toner image in the image forming area G2 following subjected to the image formation is transferred are detected by the registration sensor 105, respectively. In addition, T303 indicates a timing ("registration OFF") when the trailing end portion of the sheet P (the preceding sheet P1) onto which the toner image in the image forming area G1 is transferred is detected by the registration sensor 105. In addition, T301 and T305 indicate start timings of the scrapings, respectively. In addition, T302 and T306 indicate end timings of the scrapings, respectively. In other words, a period 330 from T301 to T302 indicates a "scraping period", which is a period during which the "scraping section" on the developing roller 121 is passing through the supplying nip portion Ns.

As shown in FIG. 3, the scraping period 330 is set so that the scraping period 330 does not overlap with a "developing period", which is a period during which a "developing section" (G1 and G2 in FIG. 3) on the developing roller 121 is passing through the supplying nip portion Ns. In other words, the scraping section is set to a non-developing section so that the scraping section does not overlap with the developing section. Incidentally, the "developing section" is, more specifically, a section on the developing roller 121 where the development is performed when the developing section first passes through the developing nip section Nd after passing through the supplying nip portion Ns. Similarly, the "non-developing section" is a section on the developing roller 121 where the development is not performed when the non-developing section first passes through the developing nip portion Nd after passing through the supplying nip portion Ns. In the scraping period 330, the toner retained on the developing roller 121 should be moved to the supplying roller 124 side, therefore it is preferable to perform the scraping over at least one round (equal to or more than one round and, for example, equal to or less than five rounds or typically equal to or less than three rounds, etc.) of the developing roller 121. Thus, for example, the scraping period 330 is set to a period corresponding to one round of the developing roller 121, etc. However, in a case in which the scraping period 330 overlaps with the developing period, it is preferable to shorten the scraping period 330 or not to perform the scraping. A method will be described below.

In addition, in FIG. 3, a chain line 320 and a solid line 321 indicate the voltages applied to the developing roller 121 and the supplying roller 124, respectively. For example, to the developing roller 121, the same voltage of −400 V is applied in both the scraping period 330 and the developing period. On the other hand, to the supplying roller 124, voltage of −300 V is applied during the scraping period 330 and voltage of −500 V is applied during the developing period. In other words, dining the scraping period, a higher voltage on an opposite side of the normal charging polarity of the toner than the voltage applied to the developing roller 121 is applied to the supplying roller 124. In addition, during the developing period, a higher voltage on the normal charging polarity side of the toner than the voltage applied to the developing roller 121 is applied to the supplying roller 124. As such, in the scraping period 330, a potential difference between the developing roller 121 and the supplying roller 124 is altered with respect to the developing period. In this way, the potential difference between the developing roller 121 and the supplying roller 124 is set so that the toner on the developing roller 121 is moved to the supplying roller 124 side during the scraping period. In addition, during the developing period, the potential difference between the developing roller 121 and the supplying roller 124 is set so that the toner is moved from the supplying roller 124 to the developing roller 121 side.

Here, a broken line 322 in FIG. 3 indicates a transition of an actual output voltage of the supplying power source E2, which includes a rising and a falling of the voltage applied to the supplying roller 124. A falling time of the voltage applied to the supplying roller 124 is indicated by a reference numeral 331 and a rising time by a reference numeral 332. Upon setting the scraping period 330, it is preferable to set the scraping period 330 with consideration of the rising time and the falling time of the voltage so as not to overlap with the developing period. In other words, upon setting the scraping section, it is preferable to set the scraping section with consideration of the rising time and the falling time of the voltage so as not to overlap with the developing section. A method will be described below. In the present Embodiment, as an example, descriptions will be continued as the falling time 331 and rising time 332 of the voltage applied to the supplying roller 124 are assumed to be 150 msec and 50 msec, respectively.

Incidentally, in the present Embodiment, as an example, the voltage applied to the developing roller 121 is assumed to be the same (−400 V) during the scraping period (scraping time) and the developing period (developing time). Therefore, in the present Embodiment, a rising time and a falling time of the voltage applied to the developing roller 121 are not considered. In a case in which the scraping voltage applied to the developing roller 121 during the scraping is set to a voltage that is different from the developing voltage applied during the development, it is preferable to set the scraping section (scraping period) also with consideration of the rising time and the falling time of the voltage applied to the developing roller 121.

Description of a Method to Determine the Scraping Settings in the Present Embodiment Next, a method to determine the scraping settings in the present Embodiment will be described. In the present Embodiment, the scraping settings are dynamically determined according to the sheet interval in cases in which the sheet interval during the print operation fluctuates.

FIG. 4 is a schematic view illustrating how the preceding sheet P1 and the following sheet P2 are sequentially conveyed to the transferring nip portion Nt. In the present Embodiment, as an example, a process speed of the image forming apparatus 100 (corresponding to a peripheral speed of the photosensitive drum 122) is set to 260 mm/sec. In addition, the nominal sheet interval during the printing operation is set to 47 mm. In addition, an outer diameter of the photosensitive drum 122 is set to 24 mm. In addition, an outer diameter of the developing roller 121 is set to 10 mm. In addition, an outer diameter of the supplying roller 124 is set to 11 mm.

In addition, as mentioned above, the nip portion formed by the developing roller 121 and the supplying roller 124 is designated as the supplying nip portion Ns. In addition, the nip portion formed by the photosensitive drum 122 and the developing roller 121 is designated as the developing nip portion Nd. In addition, the nip portion formed by the photosensitive drum 122 and the transferring roller 106 is designated as the transferring nip portion Nt. In addition, a position where the registration sensor 105 detects the sheet P with respect the conveyance direction of the sheet P is designated as a detecting position F.

Furthermore, in the present Embodiment, a distance from the supplying nip portion Ns to the developing nip portion Nd with respect to a rotational direction of the developing roller 121 is set to 17 mm. In addition, a distance from the developing nip portion Nd to the transferring nip portion Nt with respect to the rotational direction of the photosensitive drum 122 is set to 22 mm. In addition, a distance from the transferring nip portion Nt to the detecting position F with respect to a direction along the conveyance direction of the sheet P is set to 76 mm. Incidentally, in the present Embodiment, the developing roller 121 rotates at a peripheral speed in a ratio of 1.4 times compared to a peripheral speed of the photosensitive drum 122 rotating at the above process speed. As such, considering that the developing roller 121 rotates at the peripheral speed in the ratio of 1.4 times compared to the photosensitive drum 122, the distance then from the supplying nip portion Ns to the developing nip portion Nd with respect to the rotational direction of the developing roller 121 becomes an equivalent of 12.2 mm (~17 mm÷1.4) on the photosensitive drum 122. Here, a position of the supplying nip portion Ns may be represented by a center of the supplying nip portion Ns with respect to the rotational direction of the developing roller 121. In addition, a position of the developing nip portion Nd may be represented by a center of the developing nip portion Nd with respect to the rotational direction of the photosensitive drum 122. In addition, a position of the transferring nip portion Nt may be represented by a center of the transferring nip portion Nt with respect to the rotational direction of the photosensitive drum 122.

First, the sheet interval measuring means 241 calculates a sheet interval D based on the timings in which the trailing end portion of the preceding sheet P1 and the leading end portion of the following sheet P2 are detected by the registration sensor 105. The sheet interval D fluctuates due to variations in feeding of the preceding sheet P1 and the following sheet P2. Therefore, in a case in which the scraping is performed with always the same scraping section being set regardless of a timing of the sheet feeding, if the sheet interval narrows, the developing section and the scraping section may overlap, which may cause an image defect.

Therefore, in order to start the scraping so the image defect does not occur, the scraping needs to be started, at the earliest, after a timing when the toner image on the photosensitive drum 122 that is transferred to the trailing end portion of the preceding sheet P1 (more specifically, the trailing end portion of the image forming area of the preceding sheet P1) reaches a position of 12.2 mm upstream of the developing nip portion Nd with respect to the rotational direction of the photosensitive drum 122. The above timing associated with the trailing end portion of the preceding sheet P1 may be obtained based on a timing when the trailing end portion of the preceding sheet P1 is detected by the registration sensor 105. In addition, in order to end the scraping so the image defect does not occur, the scraping needs to end and voltage for the development (developing voltage, supplying voltage) needs to be set, at the latest, before a timing when the toner image on the photosensitive drum 122 that is transferred to the leading end portion of the following sheet P2 (more specifically, the leading end portion of the image forming area of the following sheet P2) reaches a position of 25.2 mm upstream of the developing nip portion Nd with respect to the rotational direction of the photosensitive drum 122. This 25.2 mm is a value adding 13 mm, which is a distance converted 50 msec, the rising time of the voltage for the development (supplying voltage) of −500 V applied to the supplying roller 124, with the process speed (=260 mm/sec×0.05 sec), to 12.2 mm which is the distance on the photosensitive drum 122 equivalent to the distance from the supplying nip portion Ns to the developing nip portion Nd with respect to the rotational direction of the developing roller 121. The above timing associated with the leading end portion of the following sheet P2 may be obtained based on a timing when the leading end portion of the following sheet P2 is detected by the registration sensor 105.

Thus, in a case in which the sheet interval D calculated by the sheet interval measuring means 241 is less than 25.2 mm, the scraping setting means 231 determines that the scraping cannot be performed without an occurrence of the image defect and the scraping is not performed during the sheet interval process. On the other hand, in a case in which the sheet interval D calculated by the sheet interval measuring means 241 is equal to or more than 25.2 mm, the scraping setting means 231 sets −300 V as the scraping voltage applied to the supplying roller 124 and an arbitrary period ranging between after the timing when the toner image on the photosensitive drum 122 that is transferred to the trailing end portion of the preceding sheet P1 reaches the position of 12.2 mm upstream of the developing nip portion Nd with respect to the rotational direction of the photosensitive drum 122 and before the timing when the toner image on the photosensitive drum 122 that is transferred to the leading end portion of the following sheet P2 reaches the position of 25.2 mm upstream of the developing nip portion Nd with respect to the rotational direction of the photosensitive drum 122 as the scraping period (i.e., sets a section on the developing roller 121 that passes the supplying nip portion Ns during the arbitrary period as the scraping section).

At least one of a start timing and an end timing of the scraping period may be changed with respect to a start timing of the feeding of the preceding sheet P1 by the feeding roller 102 (or a start timing of the feeding of the following sheet P2) so that the scraping period falls within the above range. The sheet interval D may vary depending on a combination of cases in which the preceding sheet P1 and the following sheet P2 arrive at the transferring nip portion Nt (the detecting position F of the registration sensor 105) earlier than a nominal timing, at the nominal timing, or later than the nominal timing, respectively. If the sheet interval D is wider than the nominal value, the scraping period may be set longer than that of a case in which the sheet interval D is the nominal value by changing at least one of the start timing and the end timing, while setting the scraping period so as to fall within the above range. If the sheet interval D is narrower than the nominal value, the scraping period may be set shorter than that of a case in which the sheet interval D is the nominal value by changing at least one of the start timing and the end timing, while setting the scraping period so as to fall within the above range. In addition, in a case in which the scraping period does not fall within the above range, no scraping shall be performed. Even in a case in which the sheet interval D is the same as the nominal value, the scraping period may be set so as to fall within the above range by changing at least one of the start timing and the end timing according to deviations from the nominal values of the timings when the preceding sheet P1 and the following sheet P2 arrive at the transferring nip portion Nt, respectively.

Incidentally, the sheet interval D used to determine whether or not to perform the above scraping is called as a “minimum sheet interval in which the scraping can be set” (25.2 mm in the present Embodiment). The information of the minimum sheet interval in which the scraping can be set is obtained in advance and stored in the memory 225 of the engine control portion 202.

It becomes possible for the scraping to be performed appropriately by dynamically setting the scraping section (scraping period) depending on the sheet interval D in this manner, while suppressing the image defect caused by overlapping of the developing section and the scraping section.

Incidentally, in the above explanation, for the sake of simplicity, no mention is made to variations in tolerances, etc. of each component. Provided, the scraping section (scraping period) may be set with a margin, etc. being added to the scraping section (the start timing and the end timing of the scraping period) in consideration of tolerances of members including each roller such as the developing roller 121 and supplying roller 124.

In addition, the minimum sheet interval in which the scraping can be set is a value that can be freely set as a threshold value for whether or not the scraping is performed, and is not limited to values mentioned above or dimensions of each portion of the image forming apparatus 100. For example, an optimal value which is experimentally determined can be set to the minimum sheet interval in which the scraping can be set. Information of the value may then be stored in the memory 225 of the engine control portion 202, and the scraping section (scraping period) may be set by using the information. In addition, for example, a lookup table, etc. may be set, in which the scraping section (the start timing and the end timing of the scraping period) corresponds to distances of the sheet interval D in advance based on the minimum sheet interval in which the scraping can be set. Information of the lookup table may then be stored in the memory 225 of the engine control portion 202, and the scraping section (scraping period) may be set by using the information.

Figure 5:
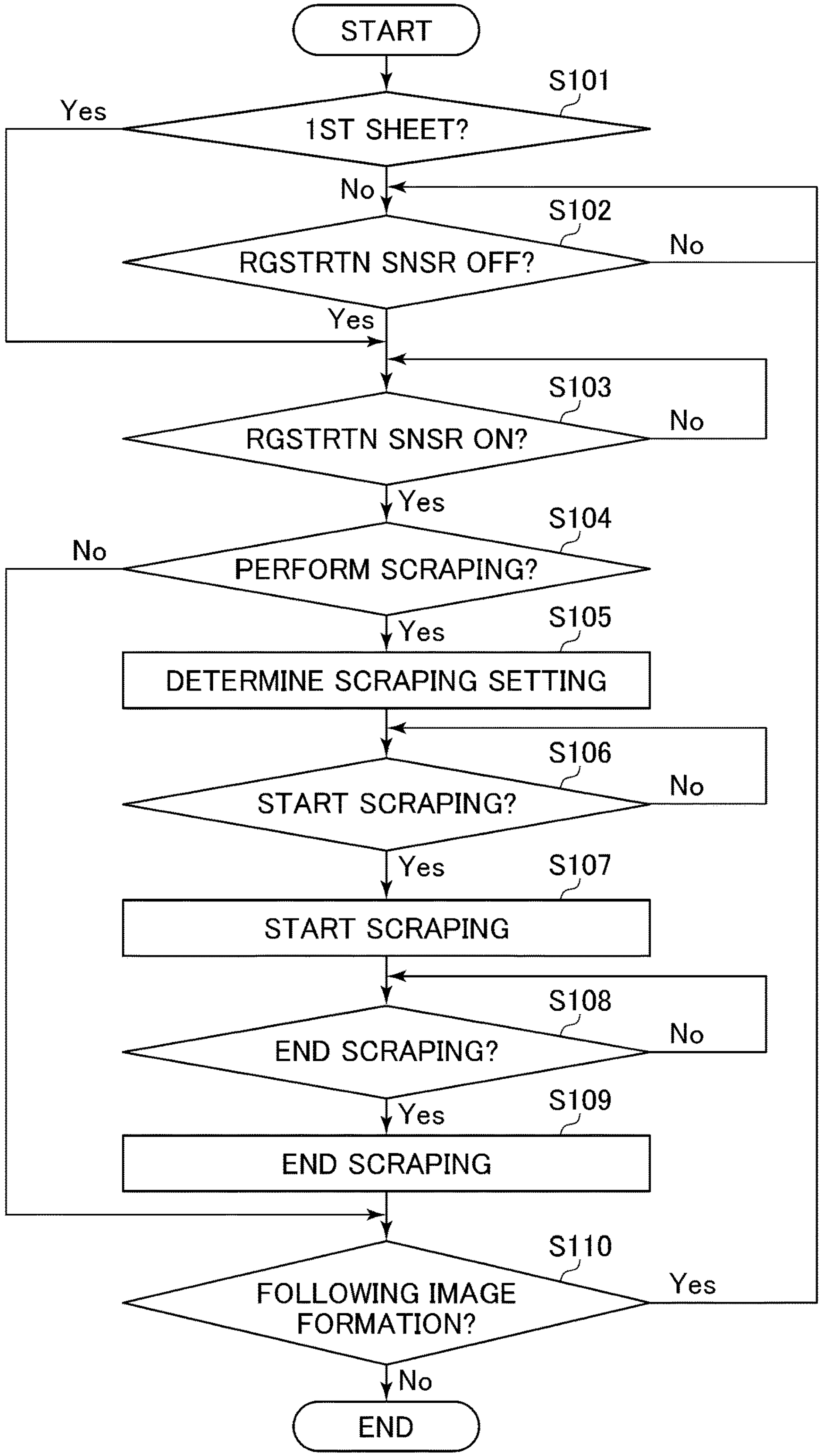
FIG. 5 is a flow chart diagram of a control of an Embodiment 1.

Next, a control procedure of the scraping in the present Embodiment will be described. FIG. 5 is a flow chart diagram illustrating an overview of the control procedure of the scraping during the performance of the print operation in the present Embodiment.

In S101, the engine control portion 202 determines whether or not the sheet P conveyed to the transferring nip portion Nt next is the first sheet P in the print operation based on the print data. If the engine control portion 202 determines that it is the first sheet (“Yes”) in S101, then the engine control portion 202 proceeds a process to S103, and if the engine control portion 202 determines that it is other than the first sheet (“No”) in S101, then the engine control portion 202 proceeds the process to S102. In S102, the engine control portion 202 waits until the trailing end portion of the sheet P passes the registration sensor 105 (until the registration sensor is turned OFF), and when the registration sensor detects the trailing end portion of the sheet P, the engine control portion 202 proceeds the process to S103. In S103, the engine control portion 202 waits until the leading end portion of the sheet Preaches the registration sensor 105 (until the registration sensor is turned ON), and when the registration sensor detects the leading end portion of the sheet P, the engine control portion 202 proceeds the process to S104.

In S104, the engine control portion 202 determines whether or not to perform the scraping. In the present Embodiment, in S104, the engine control portion 202 determines that the scraping is not to be performed if the sheet interval D obtained as described above is less than the minimum sheet interval of 25.2 mm in which the scraping can be set and if the sheet P is the first sheet in the print operation, and the engine control portion 202 then proceeds the process to S110. On the other hand, in the present Embodiment, in S104, the engine control portion 202 determines that the scraping is to be performed if the sheet interval D obtained as described above is equal to or more than the minimum sheet interval of 25.2 mm in which the scraping can be set, and the engine control portion 202 proceeds the process to S105.

In S105, the engine control portion 202 determines the scraping settings (the scraping voltage and the scraping section). In the present Embodiment, the scraping voltage applied to the developing roller 121 shall be −400 V and the scraping voltage applied to the supplying roller 124 shall be −300 V. In addition, the scraping section (scraping period) is set as described above according to the sheet interval D.

Next, in S106, the engine control portion 202 waits until the set start timing of the scraping, and when the start timing of the scraping is reached, the engine control portion 202 proceeds the process to S107. In S107, the engine control portion 202 starts the scraping and applies the scraping voltage to the developing roller 121 and the supplying roller 124. Next, in S108, the engine control portion 202 waits until the set end timing of the scraping, and when the end timing of the scraping is reached, the engine control portion 202 proceeds the process to S109. In S109, the engine control portion 202 ends the scraping and applies the voltage for the development to the developing roller 121 and the supplying roller 124.

Next, in S110, the engine control portion 202 determines whether or not there is a subsequent image formation based on the print data. If the engine control portion 202 determines that there is the subsequent image formation (“Yes”) in S110, then the engine control portion 202 returns the process to S102 to continue the process, and if the engine control portion 202 determines that there is not the subsequent image formation (“No”) in S110, then the engine control portion 202 ends the process.

Thus, in the present Embodiment, the image forming apparatus 100 comprising: the rotatable image bearing member 122 configured to bear the toner image: the rotatable developing member 121 configured to supply the toner charged to the normal polarity to the image bearing member 122 at the developing portion Nd and to form the toner image on the image bearing member 122; the supplying member 106 configured to form the supplying portion Ns by contacting the developing member 121 and to supply the toner onto the developing member 121 in the supplying portion Ns; the transferring member 106 configured to form the transferring portion Nt by contacting the image bearing member 122, the transferring member 106 transferring the toner image from the image bearing member 122 to the recording material P nipped and conveyed by the image bearing member 122 and the transferring member 106 in the transferring portion Nt; the feeding member 102 configured to feed the recording material P toward the transferring portion Nt; the detecting means 105 configured to detect information on presence or absence of the recording material P in the conveyance passage of the recording material P fed toward the transferring portion Nt by the feeding member 102; the developing voltage applying portion E1 configured to apply the developing voltage to the developing member 121; the supplying voltage applying portion E2 configured to apply the supplying voltage to the supplying member 124: and the control portion 202 configured to control the developing voltage applying portion E1 and the supplying voltage applying portion E2, wherein the control portion 202 controls to perform a first operation in which a first potential difference is formed between the supplying member 124 and the developing member 121, the first potential difference being a potential difference in a direction in which an electrostatic force in a direction toward the developing member 121 from the supplying member 124 is acted on the toner charged to the normal polarity, and a second operation in which a second potential difference is formed between the supplying member 124 and the developing member 121, the second potential difference being a potential difference in a direction in which an electrostatic force in a direction toward the supplying member 124 from the developing member 121 is acted on the toner charged to the normal polarity, and wherein when the image forming operation in which the toner image is transferred onto the recording material P is performed, the control portion 202 controls timing for changing from the first operation to the second operation based on the information detected by the detecting portion 105 in the non-image forming operation before the recording material P is nipped and conveyed at the transferring portion Nt. In addition, the control portion 202 can control timing for changing from the second operation to the first operation based on the information detected by the detecting means 105 in the non-image forming operation. It is possible to control at least one of timings of switching from the above first operation to the above second operation and from the above second operation to the above first operation.

In addition, in the present Embodiment, in a case in which the image forming operation in which the toner image is continuously transferred onto a first recording material P1 and a second recording material P2, following the first recording material P1, nipped and conveyed in the transferring portion Nt is performed, the non-image forming operation is an operation between recording materials in which the image bearing member 122 is rotated in a period when the image bearing member 122 and the transfer member 106 are in contact with each other after the first recording material P1 has been nipped and conveyed in the transferring portion Nt and before the second recording material P2 is nipped and conveyed in the transferring portion Nt. The control portion 202 can control the timing for changing from the first operation to the second operation in the operation between the recording materials based on the information of a case in which the first recording material P1 is detected by the detecting means 105. In addition, the control portion 202 can control the timing for changing from the second operation to the first operation in the operation between the recording materials based on the information in a case in which the second recording material P2 is detected by the detecting means 105. Here, more specifically, an area of the developing member 121 which forms the supplying portion Ns in a state of performing the first operation is defined as a first area, an area of the image bearing member 122 which forms the developing portion Nd with the first area by rotating of the developing member 121 and reaching of the first area to the developing portion Nd is defined as a second area, an area of the developing member 121 which forms the supplying portion Ns in a state of performing the second operation is defined as a third area, and an area of the image bearing member 122 which forms the developing portion Nd with the third area by rotating of the developing member 121 and reaching of the third area to the developing portion Nd is defined as a fourth area, and wherein the control portion 202 controls so that the fourth area forms the transferring portion Nt in a case in which the recording material P is not nipped and conveyed in the transferring portion Nt by controlling the timing for changing from the first operation to the second operation based on the information detected by the detecting means 105. In addition, more specifically, the control portion 202 controls so that the second area forms the transferring portion Nt in a case in which the recording material P is nipped and conveyed in the transferring portion Nt by controlling the timing for changing from the second operation to the first operation based on the information detected by the detecting means 105. The control unit 202 can perform controls so that the second area forms the transferring portion Nt in a case in which the recording material P is nipped and conveyed in the transferring portion Nt by controlling timing for changing from the second operation to the first operation, or that the fourth area forms the transferring portion Nt in a case in which the recording material P is not nipped and conveyed in the transferring portion Nt by controlling timing for changing from the first operation to the second operation.

As described above, according to the present Embodiment, it becomes possible to properly perform the scraping of the toner from the developing roller 121 to the supplying roller 124 side and to suppress the image defect even in cases in which the sheet interval fluctuates.

Incidentally, in the present Embodiment, the scraping during a period corresponding to the sheet interval is described, however, it is not limited for the performance of the scraping to the period corresponding to the sheet interval. For example, the scraping may be performed by setting a period from a completion of a start-up of the various actuators including the main motor 250 to a start of the development of a first image of the print operation (during a pre-rotation operation time) as the scraping period.

Next, the other Embodiment of the present invention will be described. A basic configuration and an operation of the image forming apparatus of the present Embodiment are the same as those of the image forming apparatus of the Embodiment 1. Therefore, in the image forming apparatus of the present Embodiment, with respect to elements having functions or configurations that are the same as or corresponding to the image forming apparatus 100 of the Embodiment 1 will be labeled with the same reference numerals as the Embodiment 1, and detailed explanations will be omitted. In addition, the process speed and dimensions of each component of the image forming apparatus 100 of the present Embodiment are the same as the Embodiment 1.

In the Embodiment 1, it is described that a method to determine the scraping settings according to the sheet interval D by obtaining the sheet interval D based on the timings at which the trailing end portion of the preceding sheet P1 and the leading end portion of the following sheet P2 are detected by the registration sensor 105, respectively. In the present Embodiment, a method to perform the scraping by predicting whether the sheet interval D will be widened or narrowed with respect to the nominal sheet interval at a timing when the leading end portion of the preceding sheet P1 is detected by the registration sensor 105 will be described.

Figure 6:
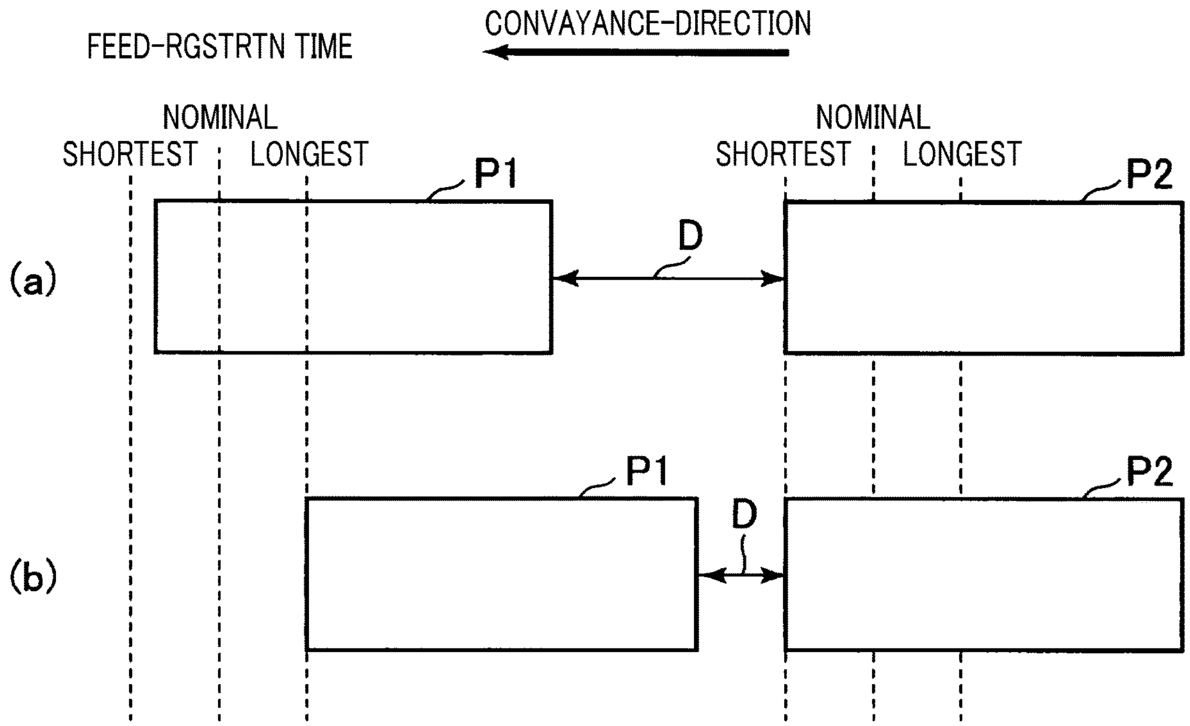
FIG. 6, part (a) and part (b), is a schematic view for explaining a method to determine a necessity of a performance of the scraping based on a feeding-to-registration time.

FIG. 6, part (a) and part (b), is a schematic view for explaining the method, in the present Embodiment, to start and end the scraping by predicting the sheet interval D. As described in the Embodiment 1, the sheet feeding interval setting means 242 determines the next timing of the sheet feeding based on, for example, the sheet length and the nominal sheet interval. Therefore, assuming that the sheet interval D does not fluctuate due to factors such as variations in the sheet feeding, the sheet interval D becomes the nominal value of 47 mm. That is, a time from the feeding timing to a reaching of the leading end portion of the preceding sheet P1 to the registration sensor 105 (here, also referred to as "feeding-to-registration time") also becomes the nominal time. Here, FIG. 6 shows how the sheet interval D fluctuates in cases in which the feeding-to-registration times of the preceding sheet P1 and the following sheet P2 are the longest, nominal, and the shortest, respectively. In the present Embodiment, as an example, the feeding-to-registration time is assumed to be 910 msec in the longest case, 850 msec in the nominal case, and 800 msec in the shortest case.

Part (a) of FIG. 6 shows a case in which the feeding-to-registration time of the preceding sheet P1 is 820 msec, which is shorter than the nominal value. In such a case, while an exact value of the sheet interval D cannot be measured when the leading end portion of the preceding sheet P1 reaches the registration sensor 105, it is possible to predict that the sheet interval D is to be equal to or more than the minimum sheet interval of 25.2 mm in which the scraping can be set even if the feeding-to-registration time of the following sheet P2 is 800 msec, which is the shortest. Therefore, it can be determined that the scraping can be performed. Therefore, in the present Embodiment, in such a case, the start timing of the scraping is set at the timing when the toner image on the photosensitive drum 122 that is transferred to the trailing end of the preceding sheet P1 reaches the position which is 12.2 mm upstream from the developing nip portion Nd with respect to the rotational direction of the photosensitive drum 122.

On the other hand, part (b) of FIG. 6 shows a case in which the feeding-to-registration time of the preceding sheet P1 is 910 msec, which is the longest. In such a case, when the leading end portion of the preceding sheet P1 reaches the registration sensor 105, it is possible to predict that there is a possibility that the sheet interval D is less than the minimum sheet interval of 25.2 mm in which the scraping can be set if the feeding-to-registration time of the following sheet P2 is 800 msec, which is the shortest. Therefore, it can be determined that it is preferable not to perform the scraping. Therefore, in the present Embodiment, the scraping is not performed in this case.

Incidentally, the end timing of the scraping may be set so that the scraping ends at or earlier than a timing when the toner image on the photosensitive drum 122 that is transferred to the leading end portion of the following sheet P2 reaches a position which is 25.2 mm upstream from the developing nip Nd with respect to the rotational direction of the photosensitive drum 122 when the leading end portion of the following sheet P2 is detected. In addition, the end timing of the scraping may be set from the sheet interval D predicted based on the feeding-to-registration time of the preceding sheet P1 as described above so that the developing period and the scraping period do not overlap even when the sheet interval D is the shortest, for example.

Here, as described above, the control portion 202 can also perform the scraping during the pre-rotation operation time which is before the development of a first image in the print operation starts, for example. In this case, the end timing of the scraping during the pre-rotation operation time can be set in the same manner as the end timing of the scraping in the case where the scraping is performed during the above sheet interval operation time. In other words, the end timing of scraping in this case may be set so that the scraping ends at or earlier than a timing when the toner image on the photosensitive drum 122 that is transferred to the leading end portion of the recording material Preaches a position which is 25.2 mm upstream from the developing nip portion Nd with respect to the rotational direction of the photosensitive drum 122 when the leading end portion of a first recording material P is detected by the registration sensor 105. The scraping during the pre-rotation operation time may be started at an arbitrary timing when the performance of the scraping becomes possible such as after the completion of the start-up of the various actuators including the main motor 250.

Figure 7:
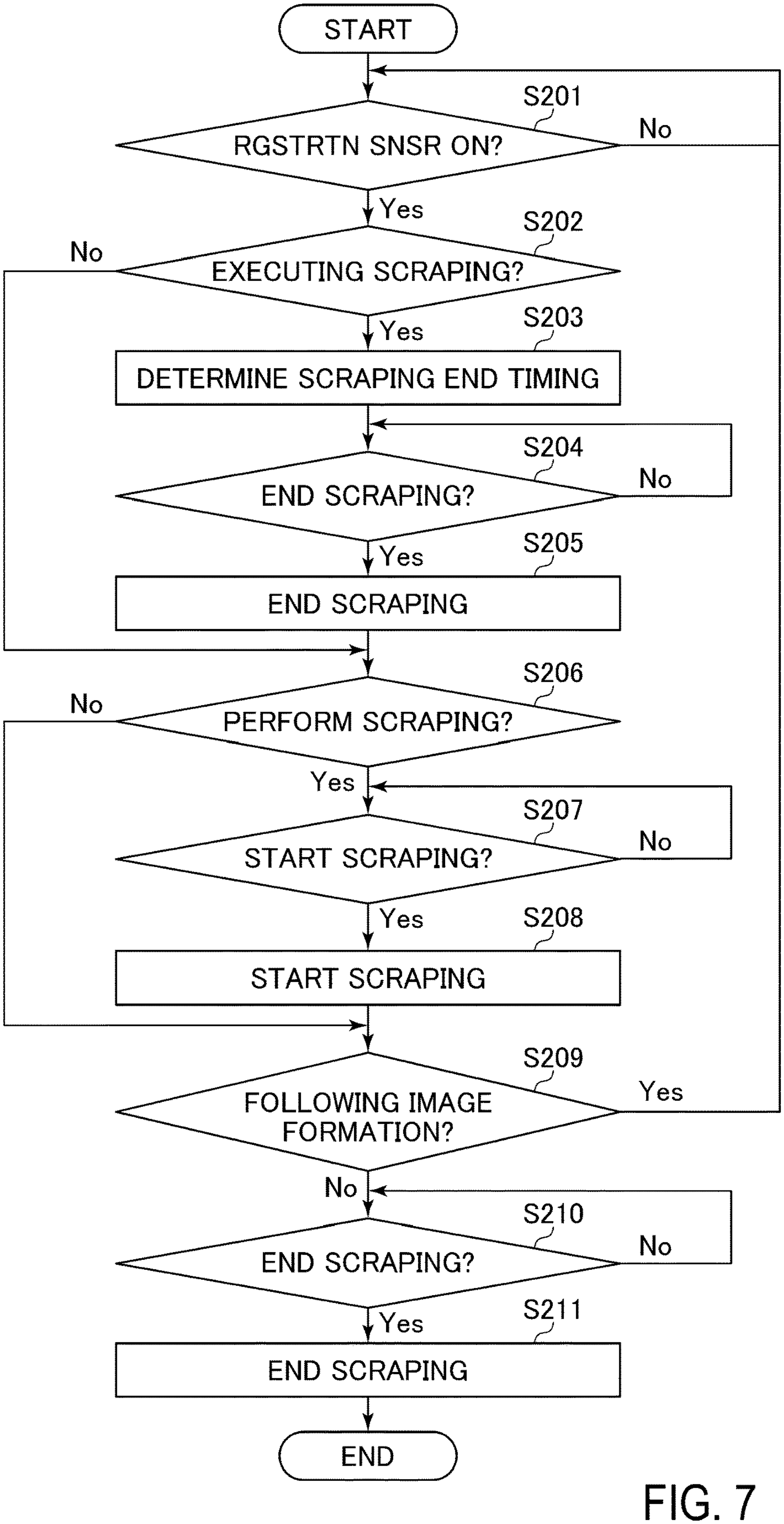
FIG. 7 is a flow chart diagram of a control of an Embodiment 2.

FIG. 7 is a flow chart diagram illustrating an overview of the control procedure of the scraping during a performance of the print operation in the present Embodiment.

In S201, the engine control portion 202 waits until the leading end portion of the sheet P is detected by the registration sensor 105, and upon detection, the engine control portion 202 proceeds a process to S202. In S202, the engine control portion 202 determines whether or not the scraping is being performed. If the engine control portion 202 determines that the scraping is being performed ("Yes") in S202, then the engine control portion 202 proceeds the process to S203, and if the engine control portion 202 determines that the scraping is not being performed ("No") in S201, then the engine control portion 202 proceeds the process to S206. In S203, the engine control portion 202 determines the end timing of the scraping as described above. Next, in S204, the engine control portion 202 waits until the set end timing of the scraping, and upon reaching the set end timing of the scraping, the engine control portion 202 proceeds the process to S205. In S205, the engine control portion 202 ends the scraping and applies the voltage for the development to the developing roller 121 and the supplying roller 124.

Next, in S206, the engine control portion 202 determines whether or not the sheet interval D predicted as described above is equal to or more than the minimum sheet interval of 25.2 mm in which the scraping can be set. If the engine control portion 202 determines that the predicted sheet interval D in S206 is equal to or more than 25.2 mm, then the engine control portion 202 determines that the scraping is to be performed and proceeds the process to S207. If the engine control portion 202 determines that the predicted sheet interval D in S206 is less than 25.2 mm, then the engine control portion 202 determines that the scraping is not to be performed and proceeds the process to S209.

In S207, the engine control portion 202 waits until the start timing of the scraping set as described above and upon reaching the start timing of the scraping, then the engine control portion 202 proceeds the process to S208. In S208, the engine control portion 202 starts the scraping and applies the scraping voltage to the developing roller 121 and the supplying roller 124. Next, in S209, the engine control portion 202 determines whether or not there is a subsequent image formation based on the print data. If the engine control portion 202 determines that there is the subsequent image formation in S209 ("Yes"), then the engine control portion 202 returns the process to S201 to continue the process, and if the engine control portion 202 determines that there is no subsequent image formation in S209 ("No"), then the engine control portion 202 proceeds the process to S210. In S210, the engine control portion 202 waits until the end timing of the scraping set as described above, and upon reaching the end timing of the scraping, the engine control portion 202 proceeds the process to S211. In S211, the engine control portion 202 ends the scraping and applies the voltage for the development to the developing roller 121 and the supplying roller 124. After that, the engine control portion 202 ends the process.

As described above, in the present Embodiment, the control portion 202 obtains information about a length of a period between the recording materials based on the start timing of the feeding of the first recording material (preceding sheet) P1 by the feeding member 102 and the timing when the leading end portion of the first recording material P1 with respect to the conveyance direction is detected by the detecting means 105.

As described above, the control portion 202 can control the timing for changing from the second operation to the first operation after changing from the first operation to the second operation, in the operation between the recording materials based on the information about a presence or absence of the recording material P in the conveyance passage of the recording material P in a case in which the first recording material P1 is detected by the detecting portion 105. In addition, the control portion 202 can control the timing for changing from the second operation to the first operation in the operation between the recording materials based on the above information in a case in which the second recording material P2 is detected by the detecting portion 105. In addition, the non-image forming operation may be a preparation (pre-rotation operation) in which the image bearing member 122 is rotated before performing the image forming operation.

As explained above, it is possible to determine whether or not to perform the scraping by predicting the sheet interval D when the leading end portion of the preceding sheet P1 reaches the registration sensor 105. By this, it becomes possible to suppress the image defect by appropriately performing the scraping of the toner from the developing roller 121 to the supplying roller 124 side.

For example, due to restrictions in the configuration of the image forming apparatus 100, there is a case in which a distance between the transferring nip portion Nt and the detecting position F may be short. In this case, as in the Embodiment 1, there is a possibility that a sufficient scraping may not be performed by the method in which the scraping settings are determined when the leading end portion of the following sheet P2 reaches the registration sensor 105, since the timing of the determination is too late. The method of the present Embodiment is effective in such a case, for example.

As described above, the present invention was described according to the specific Embodiments, however, the present invention is not limited to the above Embodiments.

In the Embodiment described above, the potential difference between the developing member and the supplying member was used as the scraping means, however, instead of or in addition to this, other means such as a change of a rotation speed of the supplying member (e.g., making it faster) and a change of a contacting pressure of the supplying member to the developing member (e.g., making it larger) may be used.

In addition, the image forming apparatus may be other image forming apparatus for various purposes such as a printer, various types of printing machines, a copy machine, a fax machine, and a multifunctional machine.

According to the present invention, it is possible to properly perform the scraping of the toner from the developing member to the supplying member side even in cases in which the sheet interval fluctuates.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152043 filed on Sep. 24, 2022, which is hereby incorporated by reference herein in its entirety.

What is claimed is:

1. An image forming apparatus comprising:

a rotatable image bearing member configured to bear a toner image;

a rotatable developing member configured to supply toner charged to a normal polarity to the image bearing member at a developing portion and to form the toner image on the image bearing member;

a supplying member configured to form a supplying portion by contacting the developing member and to supply the toner onto the developing member in the supplying portion;

a transferring member configured to form a transferring portion by contacting the image bearing member, the transferring member transferring the toner image from the image bearing member to a recording material nipped and conveyed by the image bearing member and the transferring member in the transferring portion;

a feeding member configured to feed the recording material toward the transferring portion;

a detecting portion configured to detect information on presence or absence of the recording material in a conveyance passage of the recording material fed toward the transferring portion by the feeding member;

a developing voltage applying portion configured to apply a developing voltage to the developing member;

a supplying voltage applying portion configured to apply a supplying voltage to the supplying member; and a control portion configured to control the developing voltage applying portion and the supplying voltage applying portion, wherein the control portion controls to perform a first operation in which a first potential difference is formed between the supplying member and the developing member, the first potential difference being a potential difference in a direction in which an electrostatic force in a direction toward the developing member from the supplying member is acted on the toner charged to the normal polarity, and a second operation in which a second potential difference is formed between the supplying member and the developing member, the second potential difference being a potential difference in a direction in which an electrostatic force in a direction toward the supplying member from the developing member is acted on the toner charged to the normal polarity, and wherein when an image forming operation in which the toner image is transferred onto the recording material is performed, the control portion controls timing for changing from the first operation to the second operation based on the information detected by the detecting portion in a non-image forming operation before the recording material is nipped and conveyed at the transferring portion.

2. An image forming apparatus according to claim 1, wherein when the image forming operation is performed, the control portion controls timing for changing from the second operation to the first operation based on the information detected by the detecting portion in the non-image forming operation.

3. An image forming apparatus according to claim 2, wherein an area of the developing member which forms the supplying portion in a state of performing the first operation is defined as a first area, an area of the image bearing member which forms the developing portion with the first area by rotating of the developing member and reaching of the first area to the developing portion is defined as a second area, an area of the developing member which forms the supplying portion in a state of performing the second operation is defined as a third area, and an area of the image bearing member which forms the developing portion with the third area by rotating of the developing member and reaching of the third area to the developing portion is defined as a fourth area, and wherein the control portion controls so that the second area forms the transferring portion in a case in which the recording material is nipped and conveyed in the transferring portion by controlling the timing for changing from the second operation to the first operation based on the information detected by the detecting portion.

4. An image forming apparatus according to claim 1, wherein in a case in which the image forming operation in which the toner image is continuously transferred onto a first recording material and a second recording material, following the first recording material, nipped and conveyed in the transferring portion is performed, the non-image forming operation is an operation between recording materials in which the image bearing member is rotated in a period when the image bearing member and the transfer member are in contact with each other after the first recording material has been nipped and conveyed in the transferring portion and before the second recording material is nipped and conveyed in the transferring portion.

5. An image forming apparatus according to claim 4, wherein the control portion controls the timing for changing from the first operation to the second operation in the operation between the recording materials based on the information of a case in which the first recording material is detected by the detecting portion.

6. An image forming apparatus according to claim 4, wherein the control portion controls the timing for changing from the second operation to the first operation after changing from the first operation to the second operation, in the operation between the recording materials based on the information in a case in which the first recording material is detected by the detecting portion.

7. An image forming apparatus according to claim 4, wherein the control portion controls the timing for changing from the second operation to the first operation in the operation between the recording materials based on the information in a case in which the second recording material is detected by the detecting portion.

8. An image forming apparatus according to claim 1, wherein the non-image forming operation is a preparation in which the image bearing member is rotated before performing the image forming operation.

9. An image forming apparatus according to claim 1, wherein an area of the developing member which forms the supplying portion in a state of performing the first operation is defined as a first area, an area of the image bearing member which forms the developing portion with the first area by rotating of the developing member and reaching of the first area to the developing portion is defined as a second area, an area of the developing member which forms the supplying portion in a state of performing the second operation is defined as a third area, and an area of the image bearing member which forms the developing portion with the third area by rotating of the developing member and reaching of the third area to the developing portion is defined as a fourth area, and wherein the control portion controls so that the fourth area forms the transferring portion in a case in which the recording material is not nipped and conveyed in the transferring portion by controlling the timing for changing from the first operation to the second operation based on the information detected by the detecting portion.

10. An image forming apparatus comprising:

a rotatable image bearing member configured to bear a toner image;

a rotatable developing member configured to supply toner charged to a normal polarity to the image bearing member at a developing portion and to form the toner image on the image bearing member;

a supplying member configured to form a supplying portion by contacting the developing member and to supply the toner onto the developing member in the supplying portion;

a transferring member configured to form a transferring portion by contacting the image bearing member, the transferring member transferring the toner image from the image bearing member to a recording material nipped and conveyed by the image bearing member and the transferring member in the transferring portion;

a feeding member configured to feed the recording material toward the transferring portion;

a detecting portion configured to detect information on presence or absence of the recording material in a conveyance passage of the recording material fed toward the transferring portion by the feeding member;

a developing voltage applying portion configured to apply a developing voltage to the developing member;

a supplying voltage applying portion configured to apply a supplying voltage to the supplying member; and a control portion configured to control the developing voltage applying portion and the supplying voltage applying portion, wherein the control portion controls to perform a first operation in which a first potential difference is formed between the supplying member and the developing member, the first potential difference being a potential difference in a direction in which an electrostatic force in a direction toward the developing member from the supplying member is acted on the toner charged to the normal polarity, and a second operation in which a second potential difference is formed between the supplying member and the developing member, the second potential difference being a potential difference in a direction in which an electrostatic force in a direction toward the supplying member from the developing member is acted on the toner charged to the normal polarity, and wherein when an image forming operation in which the toner image is transferred onto the recording material is performed, the control portion controls timing for changing from the second operation to the first operation based on the information detected by the detecting portion in a non-image forming operation before the recording material is nipped and conveyed at the transferring portion.

11. An image forming apparatus according to claim 10, wherein in a case in which the image forming operation in which the toner image is continuously transferred onto a first recording material and a second recording material, following the first recording material, nipped and conveyed in the transferring portion is performed, the non-image forming operation is an operation between the recording materials in which the image bearing member is rotated in a period when the image bearing member and the transfer member are in contact with each other after the first recording material has been nipped and conveyed in the transferring portion and before the second recording material is not nipped and conveyed in the transferring portion.

12. An image forming apparatus according to claim 11, wherein the control portion controls the timing for changing from the first operation to the second operation in the operation between the recording materials based on the information in a case in which the first recording material is detected by the detecting portion.

13. An image forming apparatus according to claim 10, wherein the control portion controls the timing for changing from the second operation to the first operation after changing from the first operation to the second operation, in the operation between the recording materials based on the information in a case in which the first recording material is detected by the detecting portion.

14. An image forming apparatus according to claim 10, wherein the control portion controls the timing for changing from the second operation to the first operation in the operation between the recording materials based on the information in a case in which the second recording material is detected by the detecting portion.

15. An image forming apparatus according to claim 10, wherein the non-image forming operation is a preparation in which the image bearing member is rotated before performing the image forming operation.

16. An image forming apparatus according to claim 10, wherein an area of the developing member which forms the supplying portion in a state of performing the first operation is defined as a first area, an area of the image bearing member which forms the developing portion with the first area by rotating of the developing member and reaching of the first area to the developing portion is defined as a second area, an area of the developing member which forms the supplying portion in a state of performing the second operation is defined as a third area, and an area of the image bearing member which forms the developing portion with the third area by rotating of the developing member and reaching of the third area to the developing portion is defined as a fourth area, and wherein the control portion controls so that the second area forms the transferring portion in a case in which the recording material is nipped and conveyed in the transferring portion by controlling the timing for changing from the second operation to the first operation based on the information detected by the detecting portion.

17. An image forming apparatus comprising:

a rotatable image bearing member configured to bear a toner image;

a rotatable developing member configured to supply toner charged to a normal polarity to the image bearing member at a developing portion and to form the toner image on the image bearing member;

a supplying member configured to form a supplying portion by contacting the developing member and to supply the toner onto the developing member in the supplying portion;

a transferring member configured to form a transferring portion by contacting the image bearing member, the transferring member transferring the toner image from the image bearing member to a recording material nipped and conveyed by the image bearing member and the transferring member in the transferring portion;

a feeding member configured to feed the recording material toward the transferring portion;

a detecting portion configured to detect information on presence or absence of the recording material in a conveyance passage of the recording material fed toward the transferring portion by the feeding member;

a developing voltage applying portion configured to apply a developing voltage to the developing member;

a supplying voltage applying portion configured to apply a supplying voltage to the supplying member; and a control portion configured to control the developing voltage applying portion and the supplying voltage applying portion, wherein the control portion controls to perform a first operation in which a first potential difference is formed between the supplying member and the developing member, the first potential difference being a potential difference in a direction in which an electrostatic force in a direction toward the developing member from the supplying member is acted on the toner charged to the normal polarity, and a second operation in which a second potential difference is formed between the supplying member and the developing member, the second potential difference being a potential difference in a direction in which an electrostatic force in a direction toward the supplying member from the developing member is acted on the toner charged to the normal polarity, wherein an area of the developing member which forms the supplying portion in a state of performing the first operation is defined as a first area, an area of the image bearing member which forms the developing portion with the first area by rotating of the developing member and reaching of the first area to the developing portion is defined as a second area, an area of the developing member which forms the supplying portion in a state of performing the second operation is defined as a third area, and an area of the image bearing member which forms the developing portion with the third area by rotating of the developing member and reaching of the third area to the developing portion is defined as a fourth area, and wherein the control portion controls so that the second area forms the transferring portion in a case in which the recording material is nipped and conveyed in the transferring portion by controlling timing for changing from the second operation to the first operation based on the information detected by the detecting portion, or the control portion controls so that the fourth area forms the transferring portion in a case in which the recording material is not nipped and conveyed in the transferring portion by controlling timing for changing from the first operation to the second operation based on the information detected by the detecting portion.

* * * * *